Nov. 27, 1934.　　　V. G. APPLE　　　1,982,279
APPARATUS FOR MOLDING PLASTIC MATERIAL
Original Filed April 5, 1928　　2 Sheets-Sheet 2
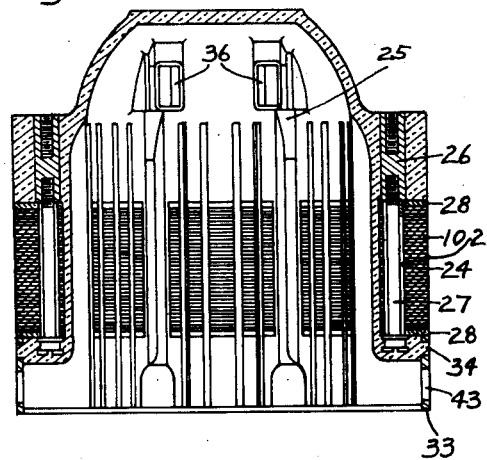
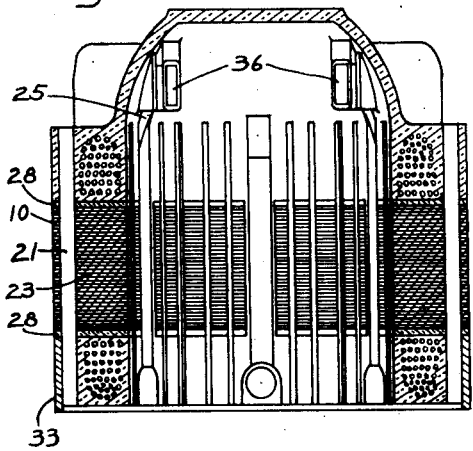
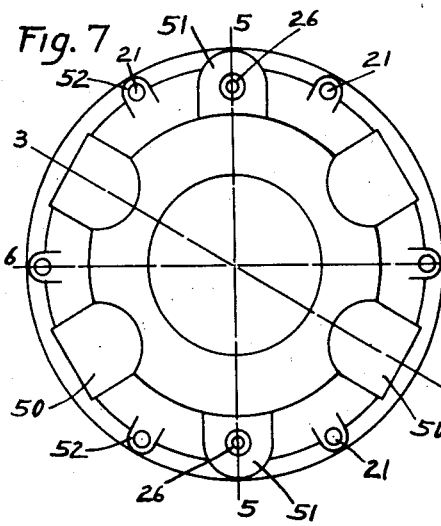
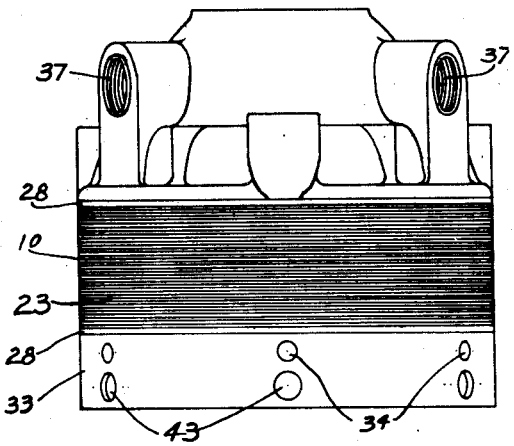
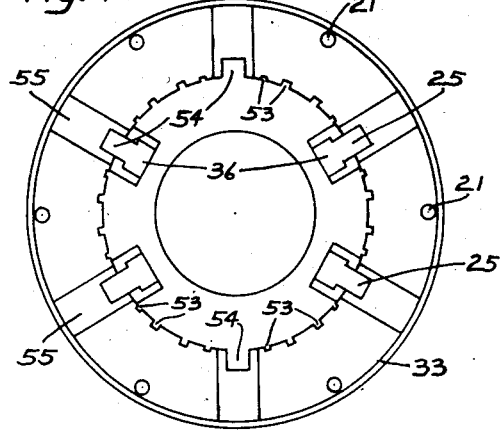
INVENTOR Patented Nov. 27, 1934

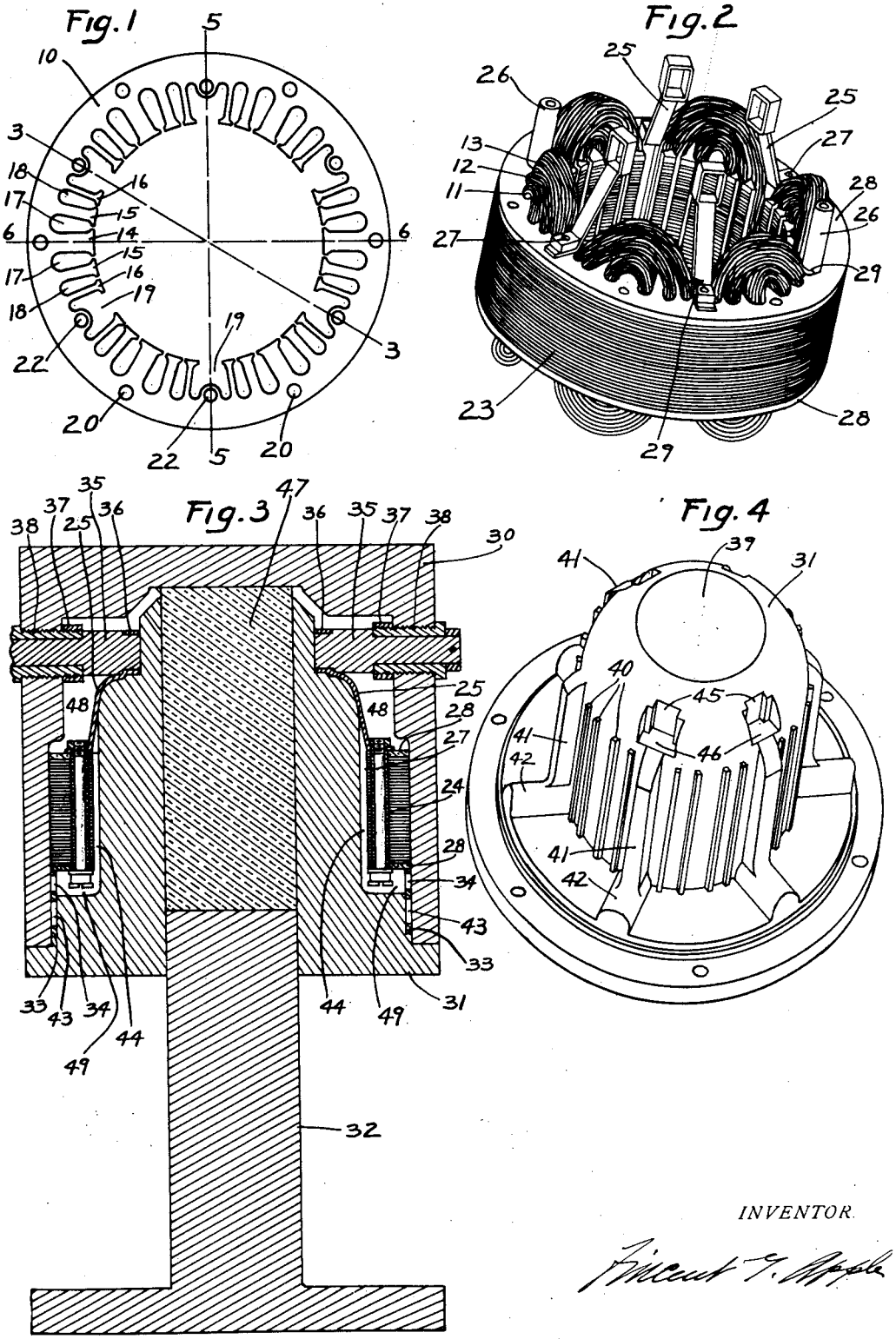

1,982,279

UNITED STATES PATENT OFFICE 1,982,279

APPARATUS FOR MOLDING PLASTIC MATERIAL

Vincent G. Apple, Dayton, Ohio; Herbert F. Apple, Edward M. Apple and Gourley Darroch, executors of said Vincent G. Apple, deceased Original application April 5, 1928, Serial No. 267,782. Divided and this application January 25, 1930, Serial No. 423,564

3 Claims. (Cl. 18—34)

This invention is a division of my copending application Serial No. 267,782, filed April 5th, 1928 and relates to apparatus for molding plastic material, and is particularly adapted to mold a housing of plastic material about the core and coils of a dynamo electric machine element.

By so proportioning the core and coils as to leave considerable space between adjacent poles, and by so proportioning the core slots that the coil sides do not altogether fill the slots, the insulating material which is being molded about the coils at one end of the core may be forced through the space between the poles and through the unfilled part of the slots to the other end of the core to form a one piece mass of insulation which covers the coil ends and sides and which consists of the two large masses at the ends of the core joined by integral struts of the same material, and it is one object of this invention to provide a mold to facilitate placing insulation about the assembled core and coils in this manner.

Another object is to so construct the mold as to form air ducts in the insulation mass extending lengthwise therethrough.

I attain these and other objects by the structure shown in the accompanying drawings wherein—

Fig. 1 is a plan of one of the core laminæ.

Fig. 2 shows the core, coils and terminals assembled.

Fig. 3 is a cross section through the mold taken to cut the field element therein at 3—3 of Figs. 1 and 7.

Fig. 4 shows the center plug of the mold in perspective.

Fig. 5 is a cross section taken at 5—5 of Figs. 1 and 7.

Fig. 6 is a cross section taken at 6—6 of Figs. 1 and 7.

Fig. 7 is a top view of the finished field element.

Fig. 8 is an elevation of the finished field element

Fig. 9 is a bottom view of the finished field element.

Similar numerals refer to similar parts throughout the several views.

To produce a field element which embodies my improvements I cut from suitable sheet magnetic material a plurality of laminæ 10, Fig. 1, slotted for a 6 pole winding having three coils 11, 12 and 13, Fig. 2 per pole. Each pole comprises five teeth 14, 15, 15, 16, 16, separated by winding slots 17, 17, 18, 18. The poles in turn are separated by the relatively wide spaces 19, 19, etc.

Openings 20 which are adapted to later provide attaching bolt holes 21 Fig. 6 are placed at the center of each pole where the magnetic flux divides, so that they remove the least needed portion of the yoke material. Other openings 22 are placed midway between poles, and after a sufficient number of laminæ are assembled to compose a core 23 Fig. 2, openings 22 are lined with tubular insulators 24 (see Fig. 3) so that brush terminal stampings 25 and line terminal posts 26 may be attached to the core by screws 27, or other suitable fastening means, and yet be electrically insulated therefrom, the two outside laminæ 28 being also of insulating material. (See also Fig. 5.)

Fig. 2 shows the core after the coils are placed and the line and brush terminals attached. The ends of the coils are joined to the terminals near their point of support on the core, as at 29, 29, etc., so that a slight deflection of the terminals during the subsequent molding operation will not impair the joints between the wires and the terminals.

Whether the coils Fig. 2 should be impregnated with insulating varnish or the like before the structure is placed in the mold wherein the housing is formed depends somewhat on the fineness of the wire in the coils, the covering on the wire, the degree of fluidity to which the insulation from which the housing is to be molded may be brought, etc. When, as in the instant case, no impregnation is required the structure Fig. 2 is ready to have the housing molded thereto and is accordingly placed and supported in a mold as shown in Fig. 3, which is a cross section so taken through the mold as to cut the field element at 3—3 of Figs. 1 and 7.

The mold Fig. 3 comprises three main parts, the body 30, the plug 31, shown also in perspective in Fig. 4, and the plunger 32. A tubular member 33 (see also Fig. 9) keeps core 23 raised, before the insulation is placed, so that ends of the coils do not rest on the bottom of the mold. Member 33 has outwardly diverging holes 34 through which the mass of molded insulation may extend to bind it to, and make it a part of the structure, and, if desired, member 33 may be further secured to the core by welding, or by bolts, screws, rivets or other fastening means. Lateral pull bars 35, squared at their inner ends, extend inwardly through the wall of body 30 through the square brush pockets 36 of brush terminal stampings 25 to hold them correctly located and to exclude molded insulation therefrom, and also to keep the core from rising in the mold, the threaded sleeve 37, into which brush spring caps may later be screwed, being supported on threaded tubes 38 which enter through correspondingly threaded holes in the mold body 30 and surround the rounded stems of the bars 35.

By reference to Fig. 4 it will be seen that plug 31 is a cylinder having an opening 39 adapted to receive plunger 32, the outside having a series of small axially extending keys 40 corresponding to, but slightly narrower than the inner ends of the winding slots in laminæ 10, and a lesser number of larger keys 41 corresponding to, but considerably smaller than the spaces 19 between coils of adjacent poles and extending axially therebetween to the lower end of the plug and there ending in lugs 42 which are adapted to form passages in the insulation extending radially outward and communicating with openings 43 in tubular member 33. (See Fig. 3.)

Keys 41, being slightly narrower and considerably less in height than spaces 19, leave apertures 44, Fig. 3 of considerable size between the surfaces of the keys and the wound structure, through which the insulation may pass when the housing in being molded, from the larger mass at the upper end of the core to supply the lesser mass at the lower end, the insulation remaining in these apertures after molding is effected being hardened along with the larger masses at opposite ends of the core to assist in tying them one mass to the other and consequently to the core. Recesses 45 admit the ends of pockets 36 and the wider portions 46 of the recesses permit insulation to surround a portion of each pocket.

When the structure Fig. 2 has been placed in the mold Fig. 3, and supported therein as indicated, plunger 32 is removed, the insulation 47 placed in opening 39, then the plunger returned. It is readily seen that when the plunger is forced upward the insulation will first fill the larger cavity 48 at the upper end of the mold and then flow through the axially extending apertures 44 between keys 41 and spaces 19 to fill the cavity 49 at the lower end.

After the insulation 47 is forced from opening 39 into cavities 48 and 49 it is hardened by whatever process the nature of the insulation requires then removed from the mold.

When the threaded tubes 33 are unscrewed and pull bars 35 which may not be rotated have been laterally withdrawn thereby and the mold body 30 has been removed and the plug 31 has been withdrawn, the structure appears as in Figs. 7, 8 and 9 wherein the closed end, Fig. 7, carries bosses 50, 50, etc., containing pockets for brushes and brush springs, bosses 51, 51 surrounding the line terminal posts, and bosses 52, 52, etc., through which attaching bolts may pass. The bottom view Fig. 9 shows the keyways 53, 53, etc., left in the molding by the small keys 40 of the plug 31, and the larger keyways 54, 54, etc., left by the larger keys 41. In a completed dynamo electric machine these keyways serve as ducts through which a cooling medium may move axially through the field element, then radially through the grooves 55, 55, etc., to the openings 43 in tubular member 33, and the material remaining in the axially extending passages 44 between the keys 41 and the spaces 19 form a series of channel shaped struts which resist axial tension brought to bear on the structure.

Tubular member 33 which served to locate core 23 in the mold now serves as a protective armor at the lower end of the core and provides the annular rib which is usually required to concentrically locate an end member carrying the armature shaft bearings. The threaded sleeves 37, now rigidly imbedded in the bosses 50, will take the wear incident to the screwing in and out of the usual screw caps which may be employed to close the brush pockets.

The mold herein shown and described embodies a feature covered in my copending application Serial No. 262,460, filed March 17th, 1928, namely that of forcing the insulation against the bottom of the stock cavity to compel it to move laterally of the movement of the plunger, so that unfluxed material may not be pressed directly against the coils as in conventional molds, but it is apparent that the features sought to be covered by the present application may be embodied in a mold of the conventional type, or in a mold of a different type, and while in the foregoing I have shown and described a structure embodying my improvements, departures therefrom, such as altering the number of poles, using a solid instead of a laminated core, a concentrated instead of a distributed pole, and many others may obviously be brought within the scope of the invention, which to further define—

I claim—

1. A mold for forming a housing of moldable material about the wound portions of the core of a dynamo electric machine element, said mold comprising, a body having a cavity fitted closely to the outside of the core, a central plug fitted closely to the bore of said core, a number of pull bars having squared inner ends extending laterally inward from the mold body into said cavity, to form pockets for brushes and brush springs in the wall of said housing and being laterally withdrawable through the mold body to form said pockets after said housing is molded, and threaded tubes surrounding a rounded part of said pull bars threaded into the mold body and extending into said cavity.

2. In a mold for forming a housing of moldable material about a wound dynamo electric machine core, a hollow member having its interior surface shaped like the outer surface of the finished housing, a second member having its exterior surface shaped like the inside of the finished housing held appropriately spaced within the first said member, a plunger for forcing moldable material into the space between the two said members in axial alignment with the said members, and a plurality of pull bars having their axes at right angles to the axis of the said plunger extending through the wall of said housing and supported at their inner ends in pockets in said second member.

3. For making a dynamo electric machine element comprising a body of molded insulation in the form of an inverted cup, having a thin bottom but heavier side walls, and a hollow magnetizable core and a fragile winding imbedded in said side walls, apparatus comprising, in combination, a mold body having a cavity extending from the bottom upward corresponding to the exterior of said inverted cup, a mold core corresponding to the interior of said inverted cup extending upwardly into said cavity to as near the upper end as the thickness of the bottom of the said cup, said core having a stock chamber extending vertically therethrough capable of containing the entire volume of unmolded plastic insulation for making said cup, and a plunger movable vertically upward in said stock chamber to such an extent as will force the entire volume of unmolded plastic insulation completely from said stock chamber, laterally over the upper edge of said mold core and downwardly around said mold core and around said magnetizable core and winding.

VINCENT G. APPLE.